Aug. 22, 1939. J. T. RYDBERG 2,170,731
DIRECTIONAL CONTROL AND STABILIZING APPARATUS
Filed Dec. 8, 1936  8 Sheets-Sheet 1

Inventor
J. T. Rydberg
By Robb & Robb
Attorney

Aug. 22, 1939.   J. T. RYDBERG   2,170,731
DIRECTIONAL CONTROL AND STABILIZING APPARATUS
Filed Dec. 8, 1936   8 Sheets-Sheet 5

Inventor
J. T. Rydberg

Aug. 22, 1939.  J. T. RYDBERG  2,170,731
DIRECTIONAL CONTROL AND STABILIZING APPARATUS
Filed Dec. 8, 1936   8 Sheets-Sheet 7

Inventor
J. T. Rydberg
By Robert Pott
Attorneys

Inventor
J. T. Rydberg
By
Robb & Robb
Attorneys

Patented Aug. 22, 1939

2,170,731

UNITED STATES PATENT OFFICE 2,170,731

DIRECTIONAL CONTROL AND STABILIZING APPARATUS

John T. Rydberg, Harrison, N. J.

Application December 8, 1936, Serial No. 114,876

14 Claims. (Cl. 244—78)

The present invention relates to steering and controlling devices for dirigible vessels and more particularly to apparatus for airplane flight control.

An object of my invention is the provision of an automatic control device especially adaptable to airplanes, airships and the like, which is light in weight, simple in construction, positive in operation and which will effectively maintain the vessel in a state of proper or perfect equilibrium at all times.

A further object is the provision of an automatic pilot device which will maintain an airplane or airship on its course automatically, compensating for lateral currents in the vessel supporting medium tending to drift it out of its course, to thereby eliminate the necessity of accurate drift calculations.

A still further object is the provision of a control device for airplanes and the like which contemplates the use of means responsive to lateral air pressures to automatically re-adjust the rudder of the ship in accordance with said lateral pressure, maintaining the course of the vessel in proper predetermined directional alignment regardless of lateral pressures or drift conditions.

Another object is the provision of an automatic pilot device having automatic means for maintaining the longitudinal and lateral stability of the vessel in its supporting medium in conjunction with means for automatically compensating for lateral drift of the vessel through its supporting means.

A still further object is the provision of an automatic control device which may be readily applied to aircraft without materially altering or changing the manual stability and rudder control device of the craft.

Another object is the use of pneumatically actuated devices connected to the "control stick" of an airplane and a cooperating gyroscopic control device for causing the actuation of certain of said pneumatic devices when the stability of the vessel is disturbed, together with supplemental pneumatic control devices adapted to be connected to the usual rudder controlling member or bar, and a pressure operated control means for controlling the action of the last-mentioned penumatic devices operated by unequal or lateral fluid pressure on the forward side portions of the airplane or vessel.

More specifically, my invention comprises a plurality of pneumatic power devices placed in opposing relation and connected to the control member or "stick" of an airplane for shifting the stick forwardly, rearwardly or laterally in either direction, and valve means for controlling the operation of each pneumatic together with supplemental or primary valve means for controlling the aforesaid valve means and the pendulum member preferably of the gyroscope type for actuating the supplemental valve means, and also including opposing pneumatics for shifting the rudder of the vessel to the left or right with valve means for controlling the pneumatics and primary valve means for controlling the last mentioned valve means, and a pair of pressure actuated vanes extending outwardly from the exterior of the vessel for shifting the primary valve means incident to unequal pressures of the vessel supporting medium on the vanes.

A still further object is the provision of opposing air vanes extending outwardly and rearwardly from the forward exterior portion of an airplane and rudder actuating means operable under the control of said vanes incident to variable movement thereof for changing the angle of the plane in the flight of the same in proportion to the lateral air pressure on one or the other of said vanes.

A still further object is the provision of a plurality of vacuum or suction operated pneumatic devices disposed in opposing relation and connected to the controls of the aircraft, and a gyroscopic controlling device for controlling the operation of the pneumatic devices together with supplemental manual control means for effecting the operation of said penumatic devices independently of the gyroscopic control device.

Another object is the provision of drift compensating mechanism for dirigible vessels having means responsive to lateral drift pressures on the side of the vessel for adjusting the rudder of the vessel in proportion to the lateral pressures so as to maintain the course or movement of the vessel as set, irrespective of the lateral drift conditions.

Another object is the provision of another supplemental control unit in the form of a movable, perforated sheet, cooperating with suitable openings, the position of the openings therein being arranged to cause shifting of the various control instrumentalities of a vessel or plane, providing a robot control device whereby the flight of the plane may be predetermined, together with perforations for rendering the automatic stabilizing and steering control operative or inoperative at will.

Other and further objects and advantages of the invention will be hereinafter set forth and the novel features thereof defined by the appended claims.

In the drawings:

Fig. 13 is an enlarged, vertical, sectional view through the detent or latch member for rendering the stabilizing unit inoperative, the dotted lines disclosing the latch member in inoperative position, while the full lines illustrate the same engaged with the upwardly extending arm of the gyro frame;

Like reference characters designate corresponding parts in the several figures of the drawings.

Referring to the drawings, A indicates generally an airplane of conventional design having the usual supporting surfaces or wings B, landing gear C, motor and cowling D, and propeller E. The horizontal rudders or elevators are illustrated at F, while the vertical rudder is shown at G. The lateral stabilizer vanes or ailerons are not shown in the drawings, but the actuating means or operating cable for the ailerons are indicated at H and H'.

The ailerons and horizontal rudders F are controlled by lateral and longitudinal movement, respectively, of the universal control rudder or "stick" I conveniently located in front of the pilot or operator's seat J. Cables for actuating the elevators are indicated at K, while the vertical rudder-actuating cables are shown at L and are preferably connected to the foot-operated rudder bar.

Figure 1:
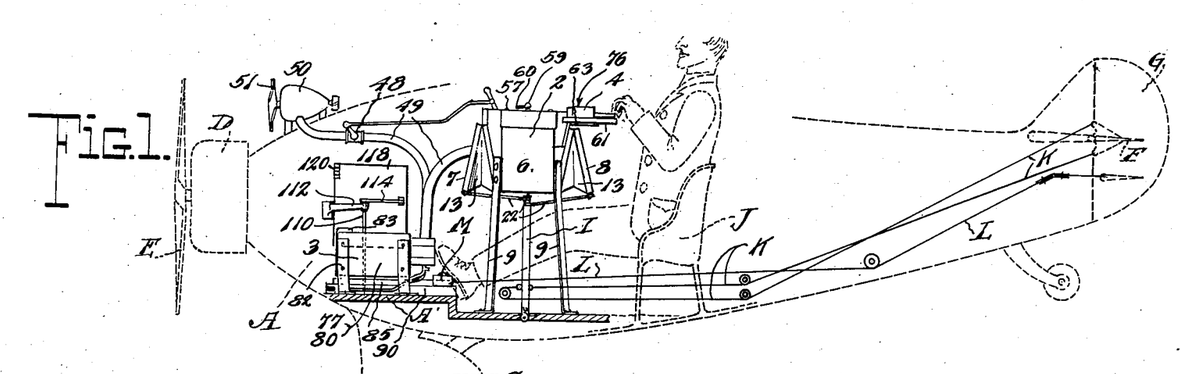
Fig. 1 is a somewhat diagrammatic side elevation of an aircraft illustrating my automatic flight control and drift compensating invention applied thereto.

My automatic control device is installed preferably in a conventional location immediately in front of the pilot's seat J, as indicated generally in Fig. 1 of the drawings and comprises the unit 2 which establishes control over the horizontal rudders or elevators F and the ailerons by means of the operating cables H and H'.

In the drawings my control unit 2 is disclosed as operating directly on the control stick I, although it is obvious that the control unit may be connected directly to the elevators and rudders and ailerons if so desired without departing from the spirit of the invention as defined in the claims.

The control unit 3 of my invention comprises a drift compensating mechanism and is connected to and operates through the rudder bar M.

A supplemental manual control device or keyboard 4 is provided which permits the pilot to take over the control of the ship whenever desired without disconnecting the automatic control mechanisms, although these mechanisms may be rendered inoperative at any time and the ship thus operated through the control stick I and the rudder bar M in the usual manner.

Figures 3, 14:
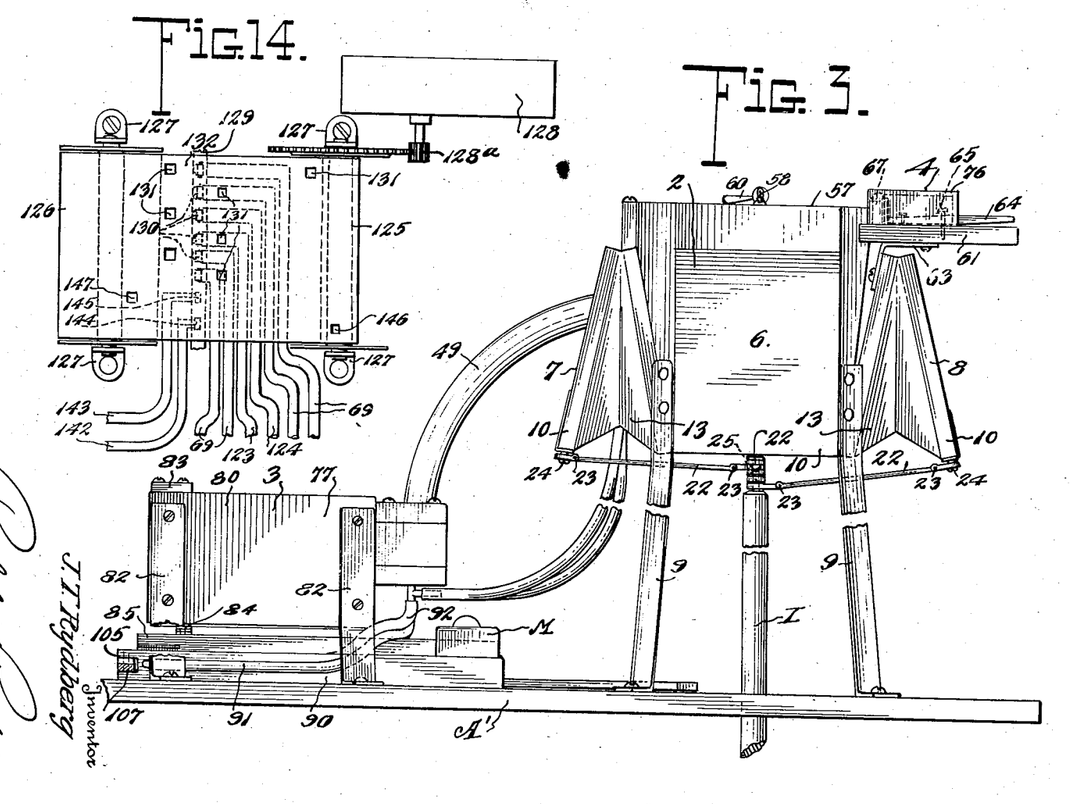
Fig. 3 is an enlarged side elevation of my improved aircraft flight control apparatus.
Fig. 14 is a plan view, somewhat diagrammatical, of an auxiliary control unit utilizing a movable sheet member, previously perforated, for operating the control elements of a dirigible vessel.

The control unit 2 comprises two pairs of opposing pneumatics 5, 6 and 7, 8, suitably supported from the floor or framework A' of the plane by standards or brackets 9, as best seen in Fig. 3 of the drawings. These pneumatics each comprise a pair of hinged side members 10 and 11 hinged to each other at 12, as best seen in Fig. 8, and are connected by the flexible covering or bellows 13, in the well known manner.

In order to provide a mounting for the stationary side members 11, I provide a horizontally disposed secondary valve chest 14 having formed therein a central or main vacuum chamber 15. Passages 16 establish communication between the interior of the pneumatics 5, 6, 7, 8 and the vacuum chamber 15, each passage being provided with a secondary pneumatic control valve 17 comprising a head portion 18 normally closing the port 16a in the passage 16 which leads to atmosphere.

The other end of each of the supplemental valve members 17 is constructed with a foot valve 19, arranged to close the passage between the vacuum chamber 15 and the passage 16 simultaneously with the unseating of the head valve portion 18.

Arranged below the enlarged lower extremity of each of the valves 17 is a valve actuated diaphragm or pouch 20. These diaphragms or pouches each comprise a flexible membrane suitably secured to the edges of a somewhat circular recess or depression 21 formed in the lower portion of the supplemental valve chest 14. Communicating passages lead from the base of each of these recesses 21 to the primary valves 17a forming a part of my automatic stabilizing control, later to be described.

The side members 10 of each of the pneumatics 5, 6, 7, 8 have an actuated link member or rod 22 connecting the same with the control member or stick 1. These link members are preferably pivoted intermediate of the length, as at 23, and are pivotally connected to the movable side 10 of the pneumatics as indicated at 24. The opposite ends of the link members 22 are pivotally connected to the control stick at 25. This arrangement provides a universal connection between the pneumatics and the stick 1, as seen in Fig. 8 of the drawings.

Mounted directly above the supplemental valve chamber 14 is my automatic stabilizer casing 26 having an air inlet or suction passage 27 leading from the central portion of the bottom of the casing into the vacuum chamber 15. The stabilizer casing is divided intermediate its length by a partition member 28 in which is swivelly mounted the gyroscope supporting frame or pendulum 29 comprising an upwardly extending lever arm 30 and a downwardly extending skeleton or hollow tubular frame 31.

An air inlet passage or bore 32 is formed in the partition 28 terminating in the annular recess or groove 33 surrounding the ball joint portion 29a of the gyroscope frame 29. A communicating passage or bore 29b extends inwardly through the ball joint portion 29a from a point adjacent the annular recess 33 and then downwardly through the center of the pendulum and communicates with the tubular members 31a of the skeleton frame 31.

An air jet-operated gyroscope 34 is suitably journaled in the frame 29 having a notched periphery 35, adjacent which is located the air jet openings 36, one of these air jets or openings being disposed in communication with each of the tubular members 31a of the frame 31.

The lower extremity of the tubular pendulum frame is provided with a projection 37 arranged to cooperate with an annular shoulder 38 projecting from the bottom of the stabilizer casing 26, limiting the lateral movement of the gyroscope.

There are four primary control valves 17a— one for each of the stabilizing pneumatics and their secondary valves 17. Each of these primary valves is provided with a somewhat elongated operating lever arm 17b disposed in closely spaced relation to the rim 39 of the gyroscope frame 29.

A valve seating spring 40 is provided for normally maintaining the valve members 17a on their seats, closing the passages 41 leading from the interior of the stabilizing casing to the underside of the valve actuating diaphragm 20.

When the aircraft having my improved stabilizing apparatus applied thereto is in normal flight and perfectly stabilized, the gyro frame is normally depending in spaced relation to the operating lever arms 17b, but upon tilting of the air craft, the gyro frame will swing laterally engaging one of the arms 17b, depending upon which direction the ship is tilted, unseating one of the valves 17a, which permits air to enter the passage 41 and be admitted under the pouch or diaphragm 20, thus lifting the secondary valve 17, which closes the passage 16 to suction or vacuum and opens the passage 16a to atmosphere, due to the upward movement of the head portion 18 of the valve 17. Air is thus admitted to one of the pneumatics 5, 6, 7, 8 relieving the tension or suction on that pneumatic and consequently the opposing pneumatic being under suction or tension will operate to move the control member toward the other pneumatic just referred to.

As the ship moves back into stabilized condition, the valve 17a will become seated permitting the valve 17 to drop, thus again establishing suction in the previously vented pneumatic, permitting the two opposing pneumatics to now equalize themselves and move the control member 1 back to its normal position.

Regulating slide valves 42 are provided for controlling the area of the passages 16 effective on the stabilizing pneumatics. These slide valves are suitably operated by the thumb screws 43. A safety valve 44 is preferably provided for controlling the degree or amount of suction or vacuum created in the chest 15, and this valve may be adjusted in an obvious manner to change the amount of vacuum as required.

In order to somewhat stabilize the operation of the gyro frame 29 to prevent undesired slight vibrations and minute oscillations of the vessel from effecting its operation with respect to the valve members 17, I provide a plurality of opposing small pneumatics 45 connected with the upstanding arm 30 of the gyro frame by the link members 46 having swivel connections somewhat similar to the link members 22 previously described.

Suction or vacuum in the passages 16 tending to collapse the pneumatics 5, 6, 7, 8 also maintains the small pneumatics 45 in opposing collapsed relation, as seen in Fig. 8 of the drawings. Communicating passages or pipes 47 lead from the interior of the pneumatics 45 to the passages 16 for the above mentioned purpose.

Upon actuation of the valve 17, atmosphere entering the passage 16 to the larger pneumatics will also be admitted through one of the passages 47 to the small pneumatics 45 on the opposite side of the stabilizer casing 26 permitting this pneumatic to be expanded and thus remove the tendency of this pneumatic to return the gyro frame to its central, inoperative position. Upon closing of the valve 17a, suction will again be applied to the small pneumatic, thus again resisting movement of the gyro frame incident to minor oscillations of the aircraft.

It will be obvious from the drawings that a vacuum or low pressure exists in the chamber 15, and since the passage 32 is open to atmosphere, air will pass through the passage 32, the annular recess 33 into the passages 29a and 29b of the gyro frame 29 and from this point will divide and move downwardly through the several tubular members 31a and outwardly through the jet openings 36, whereupon air will strike the notched periphery of the gyro wheel 34 causing the same to spin or rotate in the well known manner.

The air will then be admitted into the interior of the stabilizer casing, whereupon it will be withdrawn to a certain extent through the passage 27 communicating with the vacuum or suction chamber 15. Under the conditions, the interior of the stabilizer casing 26 will be under a lower pressure than atmosphere but a higher pressure than the vacuum chamber 15 and consequently upon opening of the valves 17a, the air admitted from the stabilizer chamber to the under side of the pouches or diaphragm 20 will be sufficient to lift the valves 17 off of their seats.

When it is desired to discontinue or interrupt the automatic stabilizing control, I may do so in two ways. In the first instance I may provide a valve member 48 in the main suction line 49 leading from the air exhausting or vacuum creating device 50, preferably operated by a fan member 51 disposed in the propeller blast zone, as seen in Fig. 1 of the drawings. Upon closing of this valve 48, all suction to the device is cut off and the pilot may then operate the controls in the usual manner.

Under some circumstances, however, it is desirable to utilize the pneumatics 5, 6, 7, 8 to actuate the stabilizing controls of the ship from a keyboard control unit, previously indicated at 4 in the drawings, and under these conditions, I provide a vertically disposed plunger or detent 52 having an annular cam surface 53 and a central notch or recess 54 arranged to receive the upper extremity 55 of the upwardly extending stabilizer arm 30.

The coil spring 56 surrounds the detent 52 and exerts tension between the upper face of the detent and the lower surface of the cover 57 enclosing the stabilizing casing and its associated parts. An actuating stem 58 projects upwardly from the detent and has pivoted thereto the actuating cam member 59, operable by a handle 60. When the handle is moved in one direction, the cam member is rotated so as to permit the detent to move downwardly and thus engage the end 55 of the arm 30. Thus the gyro frame will remain in its mid-position. The relation to the valve members 17a and any unstabilized condition of the aircraft will be ineffective.

When the handle member 60 is swung to the other position, the cam member elevates the detent 52 permitting the stabilizer and controls to become automatically effective.

Figure 4:
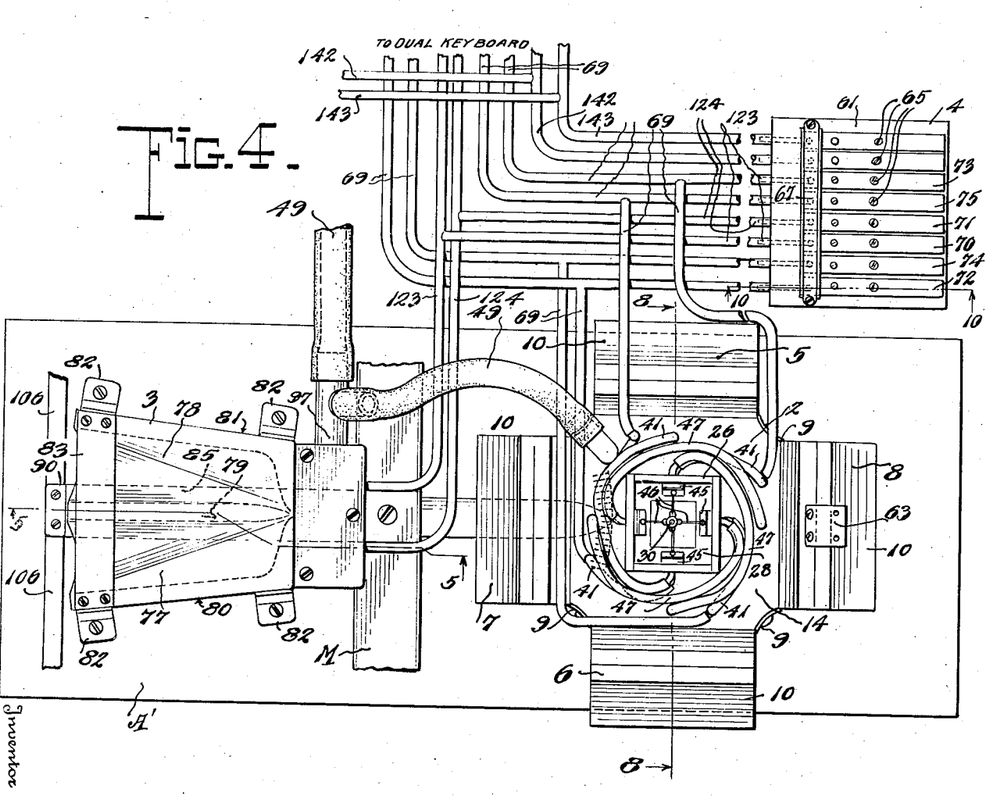
Fig. 4 is a top plan view of the construction, as seen in Fig. 3.

When it is desired to use my control keyboard 4, as seen in Fig. 4, the detent 52 is lowered to cut out the automatic stabilizing control. This keyboard comprises a base portion 61 supported in any desired manner in a convenient location with respect to the pilot or operator of the aircraft. As shown in Fig. 3 of the drawings, the supporting bracket 63 is secured to the rear of the longitudinally opposed pneumatics 7, 8 and this control keyboard is secured to the horizontal flange of this bracket.

Figure 10:
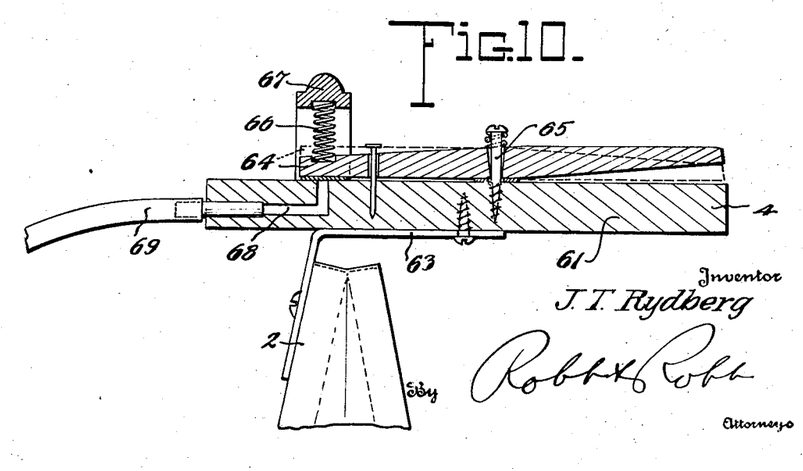
Fig. 10 is a vertical, longitudinal, sectional view taken through the manual control unit or keyboard approximately on the plane indicated by line 10—10 of Fig. 4.

A plurality of valve members 64 are pivotally mounted at 65 and are constructed somewhat similar to depressible piano keys, a spring 66 being provided for each key to hold the valve portion on its seat, as seen in Fig. 10. A spring retaining cross bar 67 extends across the control unit and constitutes the bearing for the upper ends of the springs 66. Each of the valve members or keys 64 covers a port and passage 68 to which is connected the communicating pipe 69 leading from the valve to one of the pneumatic control members, previously mentioned.

More specifically, the control keyboard comprises six keys. The two center keys 70 and 71 cause the actuation of the steering rudder G. Depression of the key 70 causes actuation of the drift compensating unit 3 to unbalance the two opposing pneumatics in this unit and shift the rubber bar M, moving the rudder G to the left, or, in other words, steers the aircraft to the left. Depression of the key 71 produces just the opposite results, steering the aircraft to the right.

The two exterior keys 72 and 73 control the horizontal rudders or elevators. Depression of the key 72 moves the elevators down to lower the nose or raise the tail of the ship when it is desired to descend to a lower altitude. Depression of the key 73 produces just the opposite result, or, in other words, lowers the tail of the ship as for instance in "taking off" or ascending to a higher altitude.

The keys 74 and 75 control the left and right ailerons respectively. Depression of the key 74 elevates the left wing, as occurs in banking the plane for a right turn, while depression of the key 75 elevates the opposite wing.

The air admitted through the pipe 69 when the valve keys 64 are actuated operates the pouches in exactly the same manner as when the valves are unseated and as a matter of fact the pipes 69 are by-passed into the passages 41 leading to the pouches or diaphragm chambers 21. A suitable closure member or cover 76 may be provided for enclosing the front portion of the key members.

Figure 7:
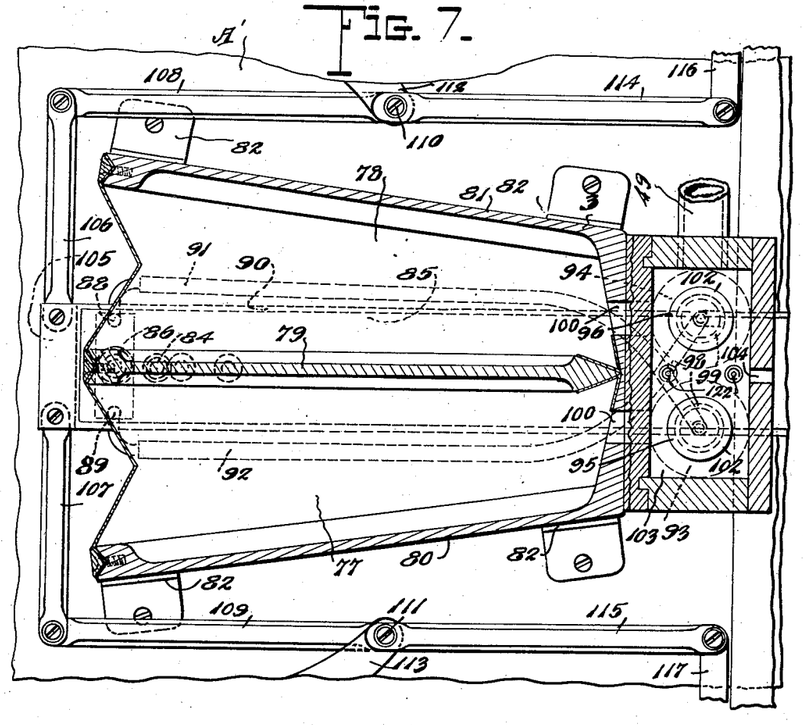
Fig. 7 is a fragmentary horizontal sectional view taken on line 7—7 of Fig. 5.
Figures 7, 8:
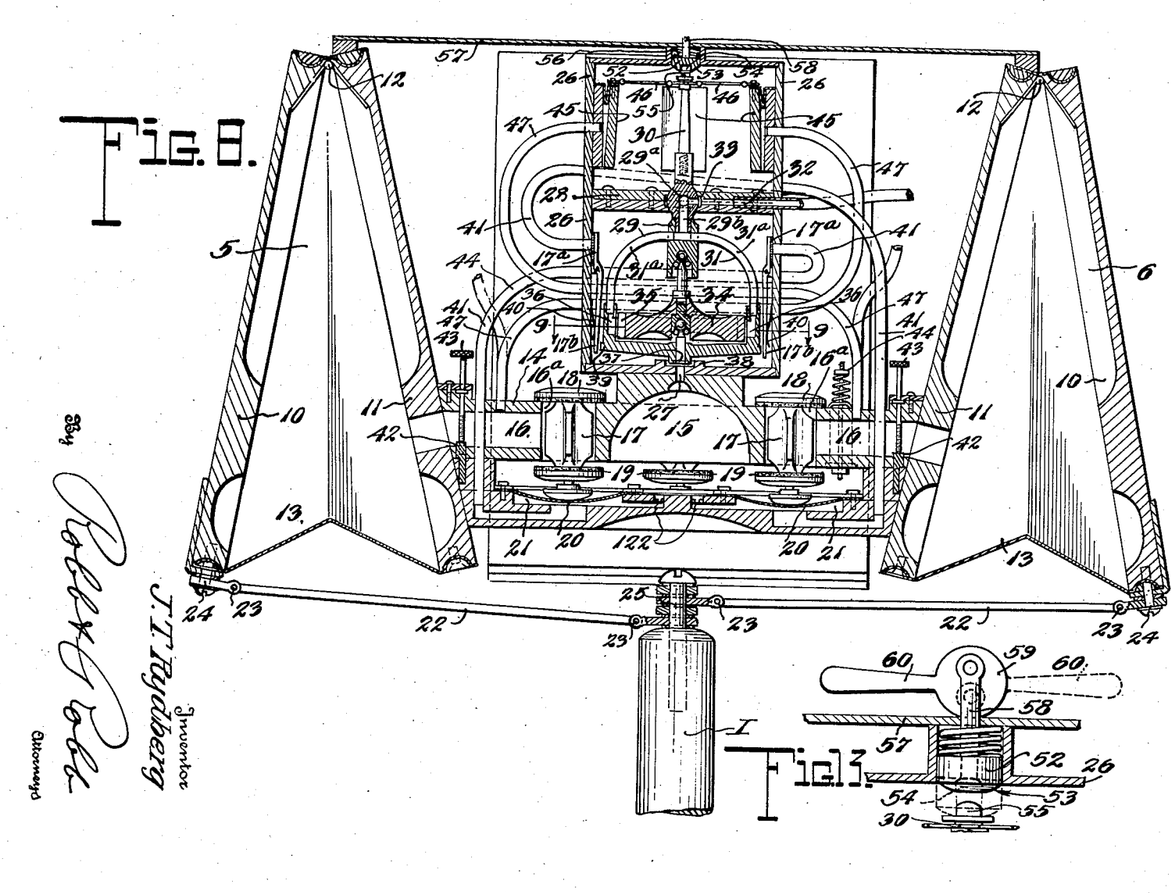
Fig. 8 is a vertical cross-sectional view taken approximately on the plane indicated by line 8—8 of Fig. 4, the arrangement and location of the air pipes and tubes being somewhat diagrammatical for the sake of clearness.
Figure 9:
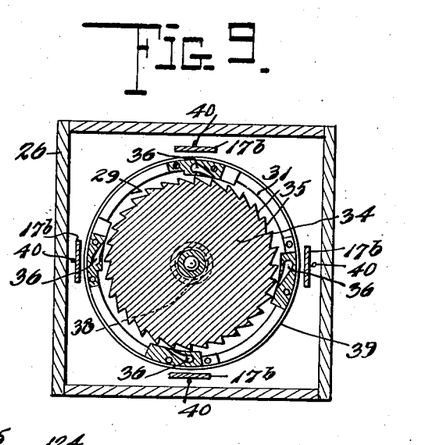
Fig. 9 is a horizontal sectional view taken approximately on the line 9—9 of Fig. 8.

My cooperating drift-compensating unit, indicated generally at 3, comprises a pair of opposing pneumatics 77, 78 having an intermediate floating vane or hinged member 79, as best seen in Figs. 4 and 7 of the drawings, the vane member constituting a common movable side of both of the opposing pneumatics 77 and 78, while the other or fixed side of each of these pneumatics is indicated at 80, 81 and supported by suitable standards 82 projecting upwardly from the framework or floor of the ship. The free ends of the fixed sides 80, 81 are connected together by the brace member 83.

Figure 5:
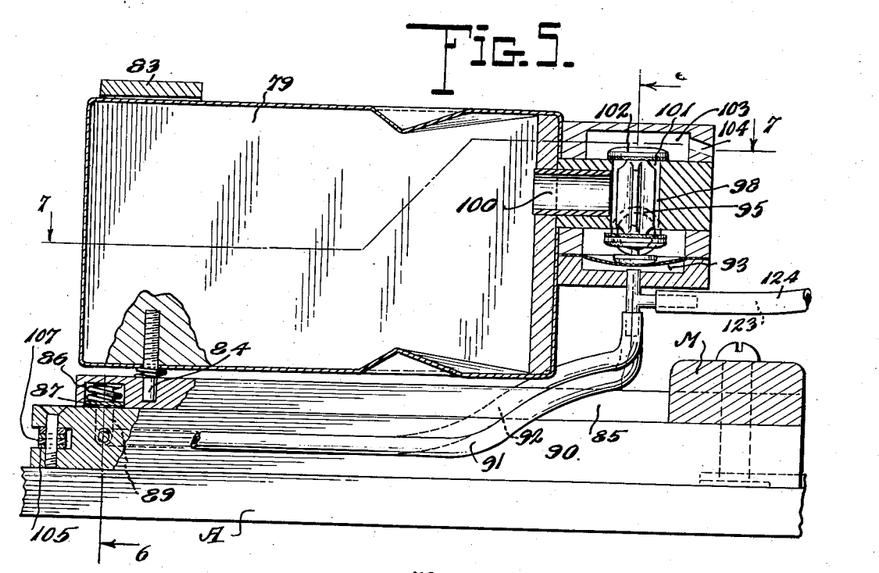
Fig. 5 is a vertical, longitudinal, sectional view taken approximately on the plane indicated by line 5—5 of Fig. 4.
Figure 6:
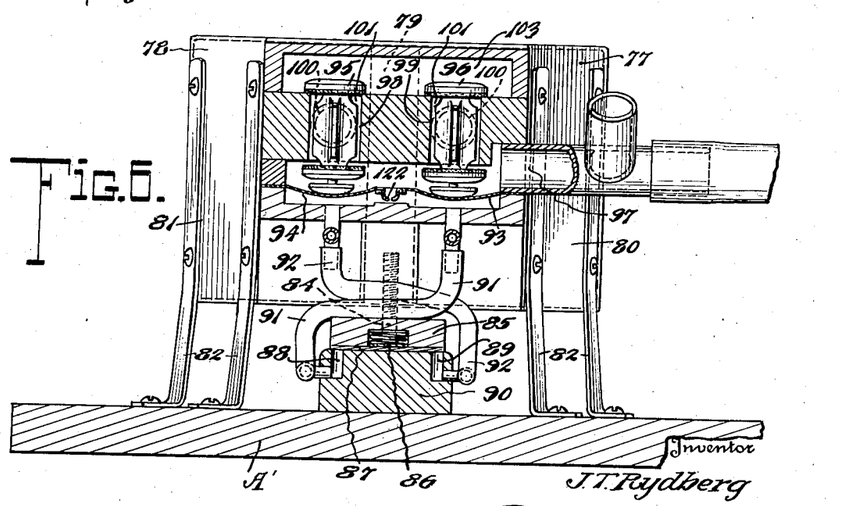
Fig. 6 is a vertical, cross-sectional view taken approximately on the line 6—6 of Fig. 5 and looking in the direction of the arrows.

By referring to Figs. 5, 6 and 7, it will be observed that the movable vane 79 is provided with an actuating pin 84 projecting downwardly into the rudder bar actuating lever 85 fixedly secured to the rudder bar M. Actuation of the vane 79 will thus shift the rudder bar actuating lever 85 and, since this lever is fixed to the rudder bar M, the rudder will be shifted in proportion to the movement of the vane 79.

The outer extremity of the actuating lever 85 is recessed at 86 to receive a control valve member 87 which cooperates with ports 88, 89 located in a shiftable drift control member 90. Lateral movement of this drift control member in one direction or the other will uncover one or the other of the ports 88 and 89. Communicating passages and pipes 91, 92 lead from the ports 88, 89 to the underside of the diaphragm or pouches 93, 94 disposed for shifting the drift control valves 95, 96.

Under normal conditions, with the drift control member 90 disposed so that the parts 88 and 89 are both covered by the rudder bar actuating lever 85, suction from the exhausting device 50 will be created through the pipes 49 and 97 which communicate, as seen in Fig. 6, with the passages 98 and 99, having by-pass openings 100 leading to the interior of the pneumatics 79 and 80. Under these conditions, suction in the passage 97 will exhaust the air equally from both of the pneumatics and thus maintain the rudder bar actuating lever 88 in fixed relation with respect to the drift control member 90.

Upon actuation of the drift control member one way or the other, one or the other of the ports 88 or 89 will be uncovered, thus permitting atmosphere to flow through the pipes 91 or 92 into the pouch chamber and raise one of the pouches or diaphragms. This movement will elevate one or the other of the drift control valve members 95, 96 somewhat in the manner as described in connection with the valve 17. The pneumatic related to the valve that is raised will be cut off from the suction and atmosphere admitted through the opening 101 leading into the passage 100, due to the unseating of the head portion 102 of the valve, the space 103 being open to atmosphere through the port 104.

Atmospheric air thus will be admitted to one of the opposing pneumatics, shifting the central vane toward the other pneumatic until the uncovered port in the drift control member is again covered, whereupon the valve will again seat and close the passage 101 to atmosphere and permit suction to again become operative on the previously vented pneumatic.

The forward or free end of the drift control member is bifurcated, as indicated at 105, to receive a pair of actuating link members 106, 107 connected to the levers 108, 109. These levers are carried on the vertical shafts 110, 111, which shafts are journaled in brackets 112, 113. The upper ends of the shafts 110 and 111 have fixed thereto the actuating arms 114 and 115 to which are pivoted the link members 116, 117, the opposite ends of these link members being pivotally connected to the drift compensating vane members 118, 119, which are in turn hinged at their forward ends, as indicated at 120, and project outward at a slight angle into the air stream around the fuselage of the aircraft.

Figure 2:
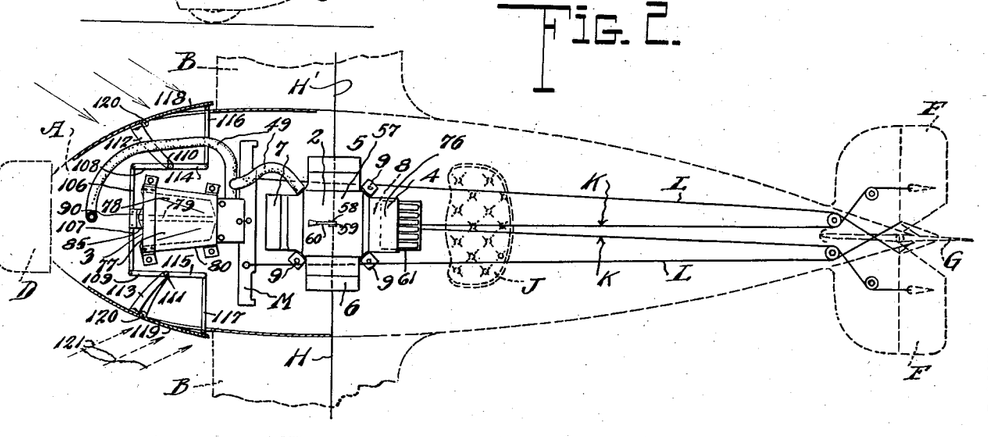
Fig. 2 is a top plan view of the invention as disclosed in Fig. 1.

Referring to Fig. 2 of the drawings, it will be observed that as the aircraft passes through its supporting medium, the pressure on both of these drift compensating vane members will be equalized, thus maintaining the drift control member 90 in its central position. When, however, cross current or lateral air pressure is encountered by the ship, as indicated by the dotted line arrows 121, as for instance making drift calculations necessary under ordinary circumstances, the vane member 119 will be pressed inwardly toward the ship in proportion to the lateral pressure exerted. This movement of the vane member will, through the linkage and lever connections 117, 115, 110, 109 and 107, shift the drift control member 90 toward the aforementioned vane member. Movement of this member 90 will uncover the port 88 due to the fact that the rudder bar actuating lever is held in its position by the two opposing pneumatics 77, 78.

However, the uncovering of this port 88 permits atmosphere to enter the space below the pouch or diaphragm 94 and raise the drift control valve member 96 venting the pneumatic 78 to atmosphere, whereupon the vane member 79 will be shifted, carrying the rudder bar actuating lever along with it until the port 88 is again closed. This operation will shift the rudder of the aircraft in direct proportion to the pressure of the lateral air currents and consequently effectively compensate for the tendency of these currents to change the course or direction of movement of the aircraft. Obviously when the air craft is passing through a supporting medium, creating a lateral pressure on the side of the craft, this drift compensating means will effectively adjust the rudder in proportion to the pressure, and maintain the ship on its course irrespective of these lateral pressures, tending to create drift conditions.

Suitable bleed openings or vents 122 are provided, establishing a very restricted communication between the suction side of the diaphragm and its opposite side, so that when the introduction of atmosphere to the under side of the pouch or diaphragm is cut off these bleed openings will then equalize the pressures or suction effect on both sides of the diaphragm.

The two conduits 123, 124 connect respectively with the center manually controlled keys or valve members 70 and 71 and establish an independent manual control for the pneumatic rudder shifting drift compensator.

Figure 11:
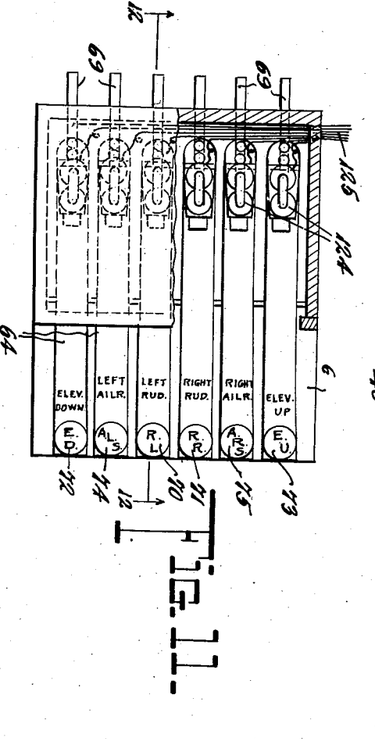
Fig. 11 is a plan view, partly in section, disclosing a modified form of manual control in which provision is made for a remote control.
Figure 12:
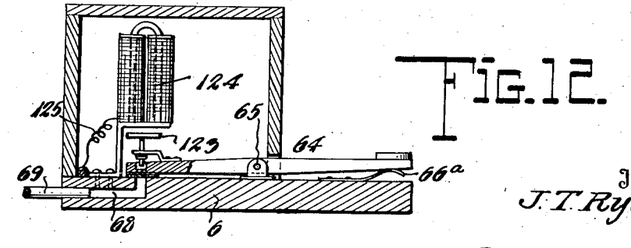
Fig. 12 is a vertical, longitudinal, sectional view taken on line 12—12 of Fig. 11.

Referring now to Figs. 11 and 12 of the drawings, it will be observed that the keyboard arrangement is provided for manual control of the vessel which is similar in general respect to the keyboard disclosed in Fig. 4. However, each of the keys, as seen in these figures, is provided with an armature 123 disposed in cooperative relation with a magnet 124.

Suitable circuits or electrical conductors 125 are provided which may lead to a supplemental control board located at a remote point on the vessel, or it is contemplated that these conductors may be energized by a radio control unit, not shown, whereby the craft may be controlled by radio from the ground.

Fig. 14 illustrates a supplemental control unit comprising a pair of cylinders or drums 125, 126 suitably journaled on brackets 127, the cylinder 125 being revolved at a constant rate by the clock-work drive mechanism 128. A tracker bar 129 is provided having openings 130 to register with openings 131 in a perforated sheet 132 disposed on the rolls 125 and 126.

In this form of invention, the pipes 69 and 123, 124 lead to the various openings 130 so that upon uncovering of any of these openings 131 in the sheet 132 atmospheric air will be admitted through the openings, raising one of the diaphragm or pouch members 20, 93, 94. This operation selectively raises one or more of the valves 17, 95, 96, causing operation of the control member associated with this valve.

The apertured sheet is prepared by arranging the openings 31 in proper sequence for a predetermined flight of the aircraft and by proper positioning of these openings the course of the plane can be accurately determined, even though this course requires several turns and changes in elevation.

In the operation of my invention, when applied to aircraft, it is desirable to "take off" with the automatic controls in their non-operative position and therefore the pilot will close the valve 49, preventing tension from reaching any of the opposing pneumatic members. Also, the air jet operated gyroscope 34 will be at rest.

After "taking off" the operator or pilot then operates the controls in the usual manner to cause the air craft to ascend to the proper elevation and adjust the course of the craft in the desired direction. The valve 48 is then shifted to establish tension between the air-exhausting device 50 and the control units 2 and 3. These units will thereupon become operative in the manner previously described and effectively control the flight of the air craft, lateral pressures being effective under these conditions on the vanes 18 and 19 which change the direction of flight of the vessel in accordance with these pressures, so that the movement of the vessel between two predetermined points is in a straight line, regardless of the lateral pressures tending to drift the vessel out of this line.

Figure 15:
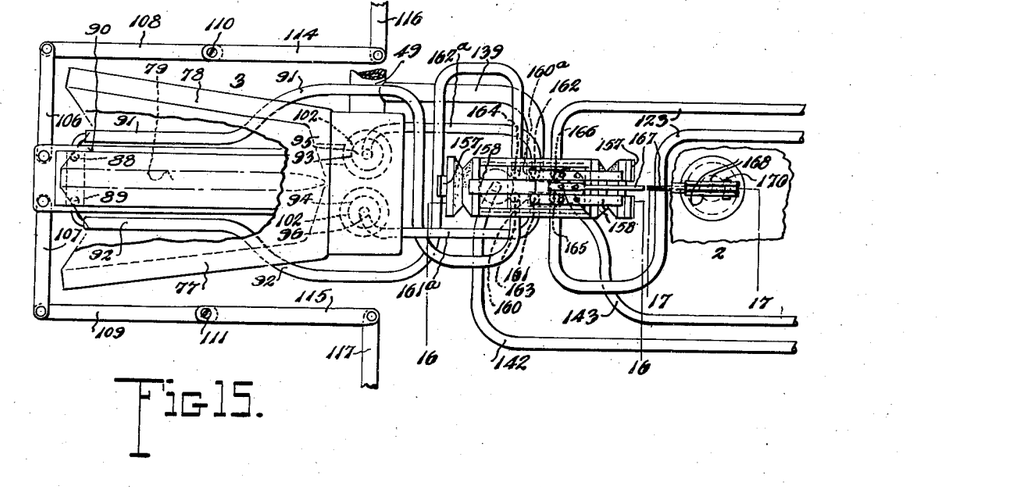
Fig. 15 is a plan view, somewhat diagrammatical, showing a modified form of supplemental valve control arrangement for the steering unit and tubing arrangement for interrupting the automatic steering or drift compensating control to permit conventional steering of the craft when desired, independent of the compensating controls.
Figures 16, 17, 18:
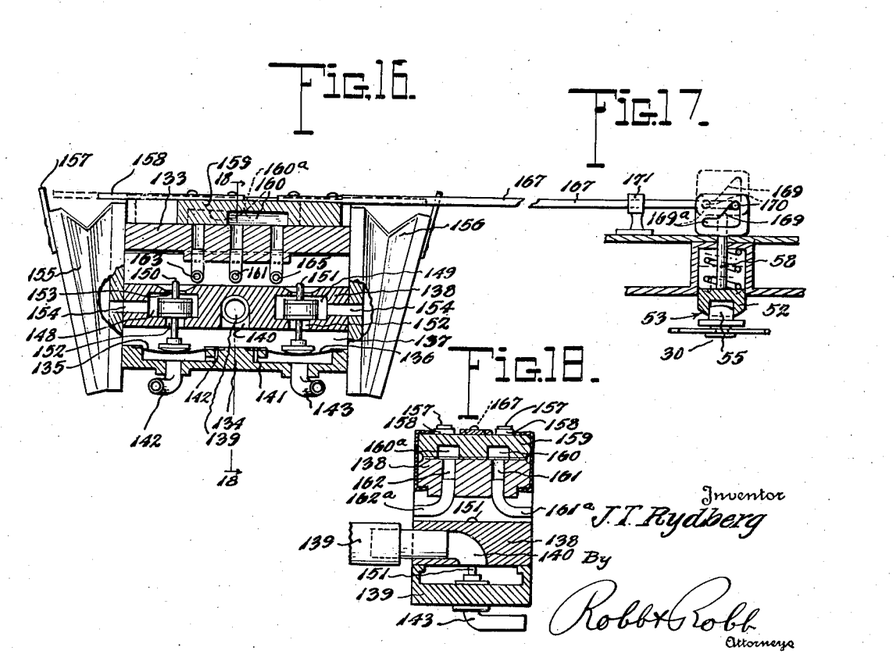
Fig. 16 is a vertical sectional view taken approximately on line 16—16 of Fig. 15.
Fig. 17 is a vertical sectional view on line 17—17 of Fig. 15 showing a modified form of shiftable control device for latching the gyroscopic member of the stabilizing unit in inoperative position under control of the pneumatically operated supplemental valve control device of Fig. 16.
Fig. 18 is a section on line 18—18 of Fig. 16.

Referring again to Fig. 14 and to Figs. 15, 16 and 17 of the drawings, I preferably provide a supplemental valve control unit or device indicated generally 133 for the purpose of rendering the automatic steering and drift compensating device inoperative when desired, to permit the course of the craft to be changed as when banking or making a turn.

The said device 133 comprises a lower pouch board 134 having recesses formed therein, and having the valve actuating pouches or diaphragms 135, 136. A suction or vacuum chamber 137 is arranged directly above the pouch board, said chamber being closed at its upper end by the valve supporting partition 138. Suction is established between the suction passage 49 and the vacuum chamber 137 through the pipe 139 connected to said passage and to the vacuum chamber 137 through a downwardly extending passage 140 in the lower face of the partitions 138. Bleed openings 141 are provided to equalize the suction on either side of the diaphragms when passages 142 and 143 are closed. These passages may have separate controlling valves for venting them to atmosphere in the form of additional key-controlled ports and manual or electrically operated keys, similar to the keys 72 to 75 in Figs. 4 or 11 of the drawings.

The depression of a key would admit atmosphere to one of the passages 142 or 143 whereupon the tension on the upper side of one of the pouches 135 or 136, depending upon which one was being actuated, would cause this pouch to be raised.

I have illustrated the passages 142 and 143 in Fig. 14 as leading to suitable openings 144 and 145 in the tracker board 129. These openings, and consequently the passages, are adapted to be vented in a pre-arranged, desired sequence by suitable openings 146 and 147 in the control sheet 132.

The valve supporting partition is suitably cored to provide openings at 148 and 149 to receive the vertically shiftable valves 150 and 151, as clearly disclosed in Fig. 16 of the drawings. A passage 152 establishes communication between the openings 148, 149 and the suction chamber, while a second passage 153 establishes communication between the openings 148 and 149 and atmosphere. A third passage 154 extends from each of the openings 148, 149 to the interior of the valve shifting pneumatics 155, 156.

Normally the valves 150, 151 close the openings 148, 149 to the suction chamber 137 and vent the pneumatics 155, 156 through the passages 153 and 154 to atmosphere, but when an opening 146 or 147 registers with one of the openings 144 or 145 in the tracker bar 129, air at atmospheric pressure enters one of the passages, raising one of the corresponding valves 150 or 151, closing the passage 153 to atmosphere and establishing suction between the chamber 137 and one of the pneumatics 155 or 156, causing the same to collapse.

Each of the pneumatics is provided with an upstanding actuating arm 157 disposed in engaging relation with respect to the abutment arms 158 projecting from the opposite ends of the slide valve 159. This slide valve is cored or recessed at 160 and 160a to alternately establish communication between the central ports 161, 162 and either of the pairs of ports 163, 164 or 165, 166 depending upon the direction in which the valve is shifted by one or the other of the pneumatics 155, 156.

As seen in Fig. 16, the valve is shown in full line position, establishing communication between the ports or passages 165 and 166 and the central passages 161 and 162, while the dotted lines illustrate the valve in its alternate position wherein communication is established between the passages 163, 164 and corresponding central ports 161 and 162.

The central ports 161, 162 communicate with passages or pipes 161a, 162a leading to the spaces below the drift control valve actuating diaphragms 94, 93. The ports 163, 164 have passages 167, 168 leading therefrom to the ports 88 and 89 respectively in the drift control member 90, while the ports 165 and 166 are provided with the communicating passages 142, 143, previously referred to.

When it is desired to change the direction of the course or flight of the craft, air will be admitted through the pipe 142, either by the extra keys 142x on the keyboard or by the opening 146 in the moving control sheet 132, causing the pouch 136 to be raised, lifting the valve 150 and thus establishing suction with the interior of pneumatic 155, causing the same to collapse. The arm 157 striking the extension 158 will shift the slide valve 159 to full line position, seen in Fig. 16.

Under these conditions, the ports 163 and 164 will be covered by the solid portion of the bottom of the valve while the two recesses 160, 160a establish direct communication between the actuating means for the valves 95 and 96 for the steering or drift control pneumatics 77, 78, and since the passages leading to the ports 88, 89 are blocked or interrupted, there is no counter or drift control when the slide valve 133 is in this position, and therefore venting of one or the other of the passages 123 will cause one or the other of the pneumatics 77 or 78 to become effective to move the rudder bar 85, attached to the floating vane 79, and steer the craft to the right or left as the case may be.

After the steering operation has been completed to change the course of the craft and it is desirable to again travel in a straight line on the new course, the passage 142 is vented to atmosphere, either by depression of a suitable control key or by registration of an opening 147 in the moving control sheet with the tracker bar opening, causing the valve 151 to be actuated, collapsing the valve-shifting pneumatic 156 and thus shifting the slide valve 159 to dotted line positions as seen in Fig. 16.

In this position, the passages 123 are interrupted or blocked by the bottom of the valve, while the recesses 160, 160a in the bottom of the valve establish direct communication between the ports 88, 89 in the drift control member 90, through the pipes 91 and 92, to the actuating pouches 93, 94 for the valves 95 and 96. Under these conditions the craft will again be under the control of the automatic drift compensating control member, as previously set forth.

On the larger commercial air crafts in which more than one steering and control member is used, such as a dual control arrangement for co-pilots, I preferably utilize more than one keyboard, their respective communicating passages 69, 123, 124 and 142, 143 (as seen in Fig. 4) leading to the various control devices being interconnected with each other by a T or Y connection 69a, 123a, 124a and 142a, 143a, so that the ship may be controlled from either one of the keyboards. With this type of installation, the flight control apparatus would not be directly connected to the control sticks, but would be located at a suitable remote position in the ship and be operatively connected to the various ailerons, rudders and elevators by mechanical means such as operating cables or the equivalent.

Under these conditions, a latch operating means for locking the gyroscopic unit in inoperative position, constructed somewhat on the principle shown in Fig. 16 will be employed, although it is obvious that in a simple embodiment the pneumatics 155 and 156 could be entirely dispensed with and the actuating rod 167 connected to the eccentric cam member 59 in Fig. 13, so that as the cam member is shifted to latch the gyroscopic member in non-operative position, the slide valve 159 will be simultaneously shifted to interrupt the drift compensating control, thus placing the craft entirely under the control of the keyboard unit 4.

As seen in Fig. 17, the latch member 52 is constructed similarly to that shown in Fig. 13 except that the stem 58 is provided with a pair of spaced plates 168 having formed therein the cam slots 169 for the reception of the crosspin 170 fixed to the end of the operating rod 167. A suitable guide braket 171 mounted on the top of the stabilizing unit 2 is provided to permit longitudinal sliding movement of the rod 167.

Referring to Figs. 16 and 17, it will be observed that as the valve 159 is shifted to the right to render the manual steering control operative, the pin 170 is moved to the right and allows the spring pressed latch 152 to be lowered, and locking the stabilizing unit in non-operative position. When the valve 159 is moved to the left to render the drift control unit operative, the pin 170 on the operating rod 167 engages the cam surface of the slot 169, raising the latch and thus also rendering the stabilizing unit 2 operative to keep the plane level.

A horizontal shoulder 169a is formed at the left hand end of the slot 169 to prevent the downward tension of the spring for the gyroscope latch member 52 from causing the pin 170 to be cammed to the right and thus accidentally moving slide valve 159 to manual control position.

It is understood that the cables and connecting means for operating the various control instrumentalities of the air craft may be modified to accord with the proper operation thereof for the various constructions, and also the tubing connections disclosed in Figs. 4 and 8 may be re-arranged, if desired, so as to render the proper pneumatics operable in accordance with the requirements for the control of the airplane instrumentalities.

Having thus described my invention, what I claim as new and desire to secure by Letters Patent is:

1. In drift-compensating course-control apparatus, in combination, a vessel adapted to travel through a supporting medium, steering means for controlling the direction of movement of the vessel in the supporting medium, adjustable automatic means operatively connected with said steering means for controlling said steering means to maintain the direction of movement of the vessel through the supporting medium constant, and control means for varying the operation of the automatic means comprising a movable member pivoted at its front end to the front end of the vessel and projecting rearwardly and exposed to lateral side pressures of the supporting medium on the front portion of the vessel tending to deviate the same from its course and connected with the automatic steering means aforesaid to adjust the same in proportion to the lateral pressures on said control means to maintain the movement of the vessel in a fixed direction irrespective of lateral pressures of the supporting medium on the vessel.

2. In a drift compensator for aircraft and the like having steering means movable pressure-responsive vanes pivoted at their forward portion to the forward opposite side portions of the vessel and projecting outwardly and rearwardly and responsive to lateral pressures of the vessel supporting medium on the forward end of the vessel tending to deviate the same from its course, and pneumatic means operable by said pressure-responsive means and connected with said steering means to adjust the steering means in accordance with said lateral pressures.

3. In an aircraft-control device of the class described, a movable control member shiftable to control the equilibrium of the aircraft, pairs of oppositely-disposed normally-tensioned pneumatics for resisting the movement of said control members, a pendulum member responsive to tilting of the aircraft, a gyroscope in said pendulum member, means to rotate the gyroscope, primary valve means for each pneumatic operable by said pendulum member, secondary valve means for each pneumatic and shiftable to render said pneumatic inoperative, secondary valve-actuating means operable by said primary valve actuating means, and pneumatic means for yieldably resisting oscillation of said pendulum, arranged to be rendered inoperative upon actuation of said secondary valve means.

4. In a drift compensator for air craft and the like having steering means, movable pressure responsive means disposed on the forward side portions of the vessel and responsive to lateral pressure of the vessel supporting medium tending to deviate the same from its course, pneumatic means operated by said pressure responsive means and connected with said steering means to adjust the steering means in accordance with said lateral pressures, separate steering control means for causing actuation of the pneumatic means to effect positive normal steering thereof, and supplemental control means movable to one position to render said separate steering means inoperative and the pressure responsive means operative and movable to another position to render the separate steering means operative and the pressure responsive means inoperative.

5. In a drift compensator for air craft and the like having steering means, movable pressure responsive means disposed on the forward side portions of the vessel and responsive to lateral pressures of the vessel supporting medium tending to deviate the same from its course, pneumatic means operated by said pressure responsive means and connected with said steering means to adjust the steering means in accordance with said lateral pressures, separate steering control means for causing actuation of the pneumatic means to effect positive normal steering thereof, supplemental control means movable to one position to render said separate steering means inoperative and the pressure responsive means operative and movable to another position to render the separate steering means operative and the pressure responsive means inoperative, and separate pneumatic means for shifting said supplemental control means to the aforesaid positions.

6. In an air craft flight control apparatus of the class described, pneumatically operated control means adapted to be connected to the flight control instrumentalities of the air craft including a rudder, ailerons and elevators, a stabilizing gyroscope device for automatically causing actuation of certain of the pneumatically operated control means when the craft is tilted to actuate the ailerons and elevators to return the craft to a state of equilibrium, drift compensating mechanism operated by lateral drift pressures for adjusting the rudder in accordance with the drift pressures to maintain the direction of flight constant, separate control means for selectively controlling the operation of said pneumatically operated control means, a supplemental shiftable control device movable to one position to render said drift compensating mechanism and said gyroscope device operative and simultaneously render said separate control means inoperative, and shiftable to another position to render said separate control means operative and said gyroscope device and said drift compensating mechanism inoperative, and means for shifting said supplemental device to the aforesaid positions.

7. In a flight control mechanism for aircraft and the like having a rudder, ailerons and elevators, a pneumatically operated drift compensating unit responsive to lateral drift pressures to adjust the rudder of the aircraft to compensate for said drift pressures, a stabilizing unit responsive to lateral and longitudinal tilting of the aircraft and including pneumatically operated means connected to the ailerons and elevators for actuation thereof to return the craft to a level position, a manual keyboard connected with both of said units for selectively actuating the pneumatic means thereof to manually control the equilibrium and direction of flight of the aircraft, and separate pneumatically operated means for rendering said drift compensating unit nonresponsive to lateral drift pressures and simultaneously rendering said stabilizing unit nonresponsive to tilting of the aircraft.

8. In a flight control device for aircrafts and the like, including a rudder, ailerons for effecting lateral stabilization of the craft and elevators for effecting longitudinal stabilization, an automatic stabilizing unit connected to the ailerons and elevators and responsive to tilting of the aircraft for actuating the ailerons and elevators to restore the equilibrium of the aircraft, a power-operated flight control device including means for causing actuation of the rudder, ailerons and elevators in a pre-determined sequence and including means for rendering said automatic stabilizing unit inoperative and operative in pre-determined sequence.

9. In a flight control device for aircraft and the like having a rudder, ailerons for effecting a lateral stabilization, and elevators for effecting longitudinal stabilization, an automatic stabilizing unit connected to the ailerons and elevators and responsive to tilting of the aircraft for actuating the ailerons and elevators to restore the equilibrium of the aircraft, an automatic drift compensating mechanism responsive to lateral drift pressures operatively connected to the rudder for adjusting the same to compensate for said lateral drift pressures, a power-operated flight control device including means for actuating the rudders, ailerons and elevators in a pre-determined sequence and including means for rendering said automatic stabilizing unit and said drift compensating mechanism inoperative and operative in the desired order to effect selective flight control of the aircraft by said automatic flight control device.

10. In a directional course-control device of the class described, the combination with a dirigible vessel adapted to travel througgh a supporting medium, steering means for determining the course of the vessel through the medium, of means responsive to lateral drift pressures of the supporting medium on the vessel tending to deviate the same from its course and operatively connected to the steering means to compensate for said lateral drift pressures and maintain the direction of movement of the vessel on its course irrespective of said lateral drift pressure conditions, a steering control means for changing the direction of movement of the vessel, and supplemental control means cooperating with said lateral drift pressure responsive means and said steering control means for selectively rendering said steering control means operative and simultaneously rendering said lateral drift pressure responsive means inoperative.

11. In an aircraft steering and stabilizing device of the class described, opposing sets of normally tensioned pneumatics connected with the ailerons and elevators of the aircraft, a gyroscope member responsive to tilting of the aircraft for venting certain of the pneumatics to atmosphere to render centain of the other pneumatics operative to move the ailerons and elevators to correct the tilt, drift compensating means com prising a pair of normally tensioned opposing steering pneumatics connected to the rudder of the aircraft and a drift control member responsive to lateral drift pressures to vent one or the other of the last mentioned pneumatics to permit the other pneumatic to actuate the rudder to compensate for the drift pressures, supplemental control means for selectively venting any of said pneumatics, and shiftable means movable to one position to render said gyroscope member and said drift compensating member inoperative and said supplemental control means operative and movable to another position to render said gyroscope member and said drift compensating member operative and said supplemental control means inoperative.

12. In an aircraft control device of the class described, opposing pairs of normally tensioned pneumatics disposed in at least two different angular intersecting planes, a connection between each pair of pneumatics and a stabilizing unit of the aircraft, pneumatic tensioning means, valve means for selectively venting certain pneumatics to render the opposing pneumatics operable to shift the aircraft stabilizing unit, and supplemental adjustable means for each pneumatic arranged between the said pneumatics and said venting valves to control the rate of flow of atmosphere into the vented pneumatics to thereby selectively control the degree of sensitivity of each pneumatic.

13. A stabilizing and steering unit for aircraft and the like, comprising a support, two pairs of normally tensioned pneumatics disposed in vertical planes at right angles to each other and having a common operating connection disposed at the point of intersection of the aforementioned planes, said connection being constructed and arranged to be connected to the usual control stick of an airplane, pneumatic tensioning means for the pneumatics, individual valve means for selectively venting said pneumatics to atmosphere to render the opposing pneumatics operative to shift the control stick away from the vented pneumatics, and a pair of normally tensioned pneumatics arranged on said support to move in a horizontal plane having an intermediate connection arranged to be connected to the usual rudder bar steering apparatus of a conventional aircraft, valve means for selectively venting said last-mentioned pneumatics to atmosphere, and a manually controlled keyboard for selectively actuating the control valves of any of said pneumatics.

14. A stabilizing and steering unit for aircraft and the like, comprising a support, two pairs of normally tensioned pneumatics disposed in vertical planes at right angles to each other and having a common operating connection disposed at the point of intersection of the aforementioned planes, said connection being constructed and arranged to be connected to the usual control stick of an airplane, pneumatic tensioning means for the pneumatics, individual valve means for selectively venting said penumatics to atmosphere to render the opposing pneumatics operative to shift the control stick away from the vented pneumatics, a pair of normally tensioned pneumatics arranged on said support to move in a horizontal plane having an intermediate connection arranged to be connected to the usual rudder bar steering apparatus of a conventional aircraft, valve means for selectively venting said last-mentioned pneumatics to atmosphere, a manual control keyboard for selectively actuating the control valves of any of said pneumatics, and a gyroscope device on said support disposed intermediate said stabilizing pneumatics arranged to selectively actuate the control valve for said stabilizing pneumatics upon tilting of the aircraft, and shiftable means for rendering said gyroscope device inoperative when in one position and operative when shifted to another position.

JOHN T. RYDBERG.